Patented Dec. 27, 1932

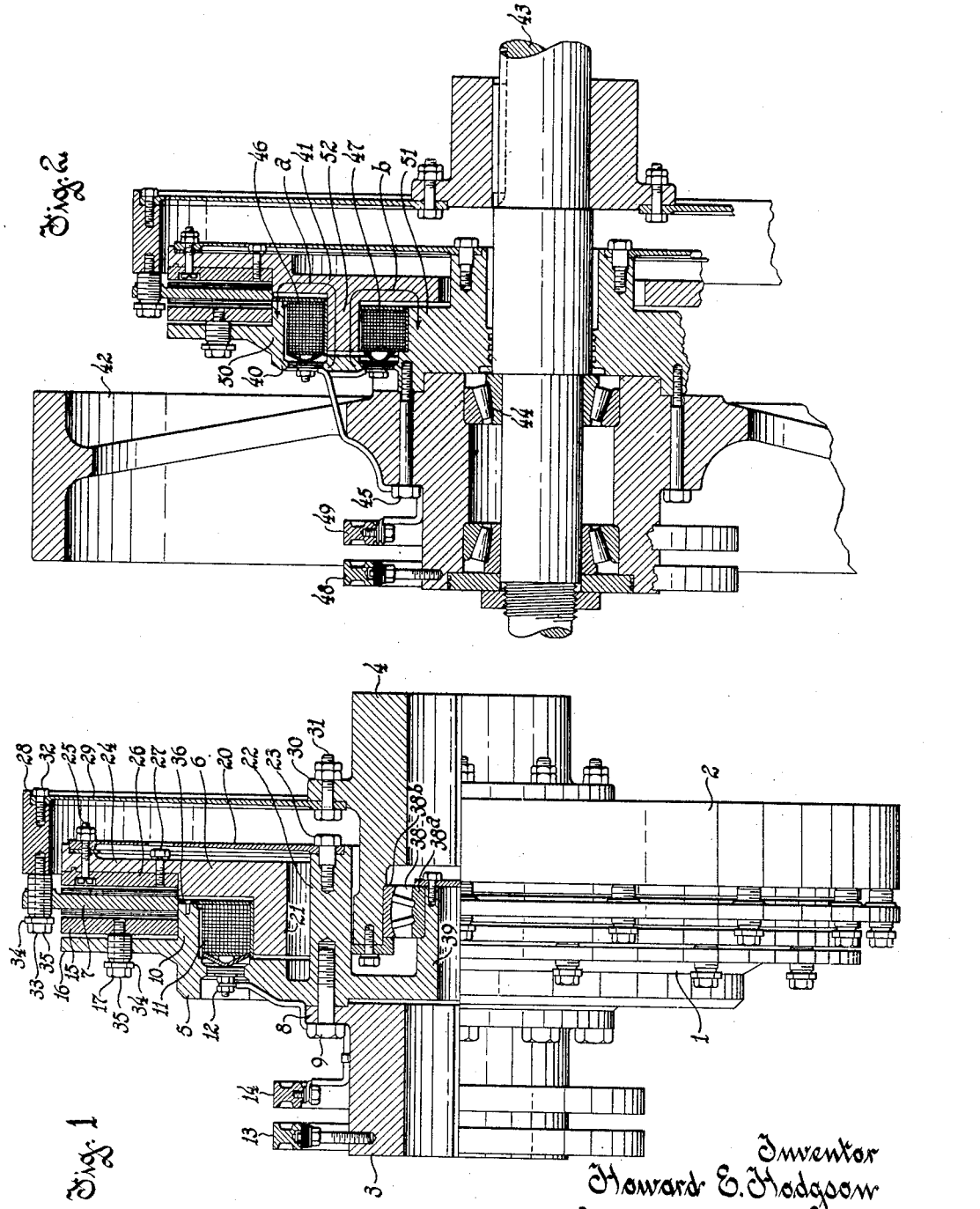

1,891,982

UNITED STATES PATENT OFFICE

HOWARD E. HODGSON, OF WAUWATOSA, WISCONSIN, ASSIGNOR TO CUTLER-HAMMER, INC., OF MILWAUKEE, WISCONSIN, A CORPORATION OF DELAWARE

ELECTROMAGNETIC CLUTCH

Application filed April 9, 1930. Serial No. 442,729.

This invention relates to improvements in electromagnetic clutches.

The invention relates more particularly to electromagnetic clutches of the duplex type wherein the driving element comprises a field member and a cooperating armature member and the driven element includes a friction ring arranged to be clamped between said members upon energization of the clutch.

Duplex clutches of this type are capable of transmitting a relatively large torque in proportion to their diameter, and because of the compactness thereof the same may be advantageously used for driving machines of various types, as for example power presses. However, as heretofore designed such clutches were open to numerous objections. For example, it was difficult to align the parts of the driving and driven elements so as to insure proper engagement of the friction faces. Also such clutches were likely to chatter and be noisy in operation because of loose driving connections between certain of the parts, and were likely to slip due to leakage of oil from the bearing parts to the friction faces.

The present invention has among its objects to provide an improved clutch of the duplex type which will overcome the aforementioned objections.

Another object is to provide a clutch of the duplex type having improved means associated therewith for effecting relative adjustment of the friction parts.

Another object is to provide a quickly releasable clutch which is of large capacity in proportion to its diameter, and which is particularly adapted for use in connection with machines such as power presses.

Various other objects and advantages of the invention will hereinafter appear.

The accompanying drawing illustrates certain embodiments of the invention which will now be described, it being understood that the embodiments illustrated are susceptible of being modified without departing from the spirit and scope of the appended claims.

In the drawing,

Figure 1 is a side view of one form of clutch embodying the invention, the upper half of the clutch being shown in section.

Fig. 2 is a sectional view of a modified form of clutch embodying the invention.

The clutch illustrated in Fig. 1 includes a driving element 1 and a driven element 2, said elements being provided with hubs 3 and 4 to be secured respectively to adjacent ends of a driving and a driven shaft. Driving element 1 includes a circular field member 5 and a circular armature member 6 and the driven element 2 includes an annular friction ring 7 to be clamped between friction faces on said field and armature members upon attraction of the armature member to thereby establish a driving connection between hubs 3 and 4.

More specifically, field member 5 is fixed to a projecting flange 8 on hub 3 by bolts 9, and the same is provided with an annular pole projection 10 which surrounds an annular magnet coil 11. Magnet coil 11 is wound upon a suitable bobbin which is fixed to field member 5, and said coil is provided with a pair of terminals, one of which is illustrated at 12 in the drawing. The terminals of coil 11 are connected by suitable leads to insulated slip rings 13 and 14 which are mounted upon hub 3. A friction ring 15 for engaging the left hand face of friction ring 7 is slidably mounted upon the outer surface of pole projection 10 and said friction ring is secured to a peripheral flange 16 on field member 5 by a plurality of adjustable securing devices 17.

The armature member 6 is secured to field member 5 through the medium of an annular spring disk 20 and is provided with an annular pole projection 21 which projects into the opening in coil 11. Spring disk 20 is secured adjacent its inner edge to an annular projection 22 on field member 5 by bolts 23, and said disk is secured adjacent its outer edge to a peripheral flange 24 on armature member 6 by bolts 25. Armature member 6 carries a friction ring 26 for engaging the right hand face of friction ring 7, said ring being secured to flange 24 by the spring disk bolts 25 and by additional bolts 27.

Friction ring 7 has friction linings secured to the opposite faces thereof, and the same is secured to a ring member 28 which is carried by an annular spring disk 29 secured to hub 4. Spring disk 29 is secured adjacent its inner edge to a flange 30 on hub 4 by bolts 31 and ring member 28 is fixed to said disk adjacent the periphery thereof by bolts 32. Friction ring 7 is secured to ring member 28 by a plurality of adjustable securing devices 33.

The devices 33 associated with friction ring 7 and the securing devices 17 associated with friction disk 15 are of similar construction. Each of said devices includes a screw plug 34 and a cap screw 35 rotatable within an opening in said plug. The plugs 34 associated with the securing devices 33 are screwed into threaded openings in friction ring 7 and the inner ends of said plugs engage the left hand face of ring member 28 and are clamped thereagainst by the associated cap screws 35. As is apparent, by loosening cap screws 35 of devices 33 friction ring 7 may be adjusted axially by its associated screw plugs 34 to center the same with respect to the friction disks 15 and 26.

The screw plugs 34 of adjusting devices 17 are screwed into threaded openings in the flange 16 and friction ring 15 is held against the inner ends of said plugs by the associated screws 35. By loosening the cap screws 35 associated with securing devices 17 friction ring 15 may be adjusted axially by its associated screw plugs 34. As is apparent, in order to effect clamping of friction ring 7 between friction rings 26 and 15 it is necessary to adjust the latter friction ring so as to maintain an air gap between armature member 6 and field member 5 upon energization of the clutch.

It will be noted that as the friction surfaces of the clutch wear down the air gap between armature member 6 and field member 5 decreases. However, in order to provide for quick release of the clutch it is necessary to maintain an air gap between said members, and for this purpose pole projection 10 has a non-magnetic shim 36 fixed to the face thereof to prevent contact of the pole faces of said members. As is apparent, when the wear on the friction surfaces is such that armature member 6 engages shim 36 the clutch will slip and it is then necessary to readjust friction ring 15 to compensate for such wear.

In the embodiment illustrated in Fig. 1 the driving and driven elements are held in centered relation by a roller bearing 38 having an inner race 38ª fixed to an axially extending projection 39 on field member 5 and an outer race 38ᵇ which fits within a counter bore in the left hand end of hub 4.

Referring now to Fig. 2, the same illustrates a modified form of clutch embodying the invention, such clutch being designed to release in a relatively short interval, and being particularly adapted for use in connection with machines such as power presses. The clutch shown in Fig. 2 includes a field member 40 and an armature member 41 of modified form, the field member being mounted upon a driving pulley 42 rotatably mounted upon the driven shaft 43. In other respects the construction of the clutch shown in Fig. 2 is similar to that shown in Fig. 1.

More specifically, pulley 42 is carried by a roller bearing 44 mounted upon shaft 43 and field member 40 is fixed to the hub portion of said pulley by bolts 45. Said field member has a pair of concentrically arranged annular magnet coils 46 and 47 mounted thereon and current is supplied to said coils from insulated collector rings 48 and 49 mounted upon the hub of pulley 42. The diameter of the coils 46 and 47 is such as to provide an annular space therebetween. Field member 40 is provided with an annular pole projection 50 which surrounds coil 46 and a pole projection 51 located within coil 47, while the armature member 41 is provided with an annular pole projection 52 which extends into the annular space between said coils.

The magnet coils 46 and 47 are so connected that the current flow therein is in opposite directions and said windings thus produce separate magnetic fields, the direction of the flux in said fields being indicated by arrows $a$ and $b$.

As is well known, an electromagnetic clutch does not release immediately when deenergized due to the self-inductance of its windings. However, it has been found that by arranging the coils in the manner above stated the total self-inductance of the coils in the clutch shown in Fig. 2 is less than the self-inductance of a corresponding single coil arranged as shown in Fig. 1. The clutch shown in Fig. 2 is therefore adapted to release after a relatively short interval, and for this reason is particularly adapted for use in connection with machines such as power presses where quick release is essential.

Clutches of the construction illustrated in Figs. 1 and 2 have numerous advantages. For example, by employing spring disks the cooperating friction faces are adapted to conform to each other, even though out of alignment, and the biasing action of said disks also tends to effect quick release of the clutch when the same is deenergized. Also it should be noted that by employing spring disks sliding driving connections are eliminated and leakage of oil from the bearing parts to the friction faces cannot occur. As is apparent, any oil leaking from the bearing parts is thrown outwardly between the spring disks and cannot come in contact with the friction faces.

What I claim as new and desire to secure by Letters Patent is:

1. In a magnetic clutch, the combination with cooperating field and armature members, of a spring disk driving connection therebetween, a friction element to be clamped between said members and a spring disk for supporting said element.

2. A magnetic clutch comprising driving and driven elements, one of said elements including cooperating field and armature members and the other element including a friction part to be clamped between said members, a spring disk supporting one of said members and connecting the same to the other of said members and a second spring disk supporting said friction part.

3. A magnetic clutch comprising concentrically arranged field and armature members, a spring disk secured to said field member and supporting said armature member, an annular friction member to be clamped between said field and armature members and a spring disk for supporting said friction member.

4. A magnetic clutch comprising concentrically arranged magnet members, an annular spring disk secured adjacent its inner edge to one of said members and adjacent its outer edge to the other of said members, a friction ring arranged between said members, an annular spring disk for supporting said ring, and means for adjustably securing said friction ring to last mentioned spring disk adjacent the periphery thereof.

5. In a magnetic clutch, in combination, two axially aligned hubs, an annular spring disk fixed to one of said hubs, a friction ring fixed to said disk contiguous to the periphery thereof and adjustable axially with respect thereto, a pair of magnet members carried by the other of said hubs, said members having relatively adjustable friction surfaces for engaging said friction ring on opposite sides thereof and a second annular spring disk for supporting one of said magnet members.

6. In a magnetic clutch, in combination, two axially aligned hubs, an annular spring disk fixed to one of said hubs, a friction ring fixed to said disk contiguous to the periphery thereof, a pair of magnet members arranged on opposite sides of said friction ring, one of said magnet members being fixed to the other of said hubs and having a projection thereon extending through a central opening in the other of said magnet parts and a second spring disk secured to said projection and supporting said last mentioned magnet part.

7. In an electromagnetic clutch, the combination with cooperating field and armature members, of a friction element to be clamped between said members, a support for said element, a plurality of adjustable screw devices for securing said friction element to said support and for adjusting the same axially with respect thereto, and spring means associated with said support for normally holding said friction element out of engagement with both of said members and for permitting axial movement of said element upon clamping thereof between said members.

In witness whereof, I have hereunto subscribed my name.

HOWARD E. HODGSON.